United States Patent Office

3,230,273
Patented Jan. 18, 1966

3,230,273
SELECTIVE MEMBRANES FROM RUBBER HYDRO-
CHLORIDE AND CHLORINATED RUBBER
Jan Hendrik van der Neut, Rijswijk, Hermannus Ger-
hardus Roebersen, The Hague, Alfred Schors, Delft,
and Oebele Pieter van der Werff, Emmastad, Nether-
lands, assignors, by mesne assignments, to American
Machine Foundry Company, New York, N.Y., a cor-
poration of New Jersey
No Drawing. Original application Apr. 19, 1955, Ser.
No. 502,532, now Patent No. 2,972,586, dated Feb. 21,
1961. Divided and this application Jan. 13, 1961, Ser.
No. 82,387
Claims priority, application Netherlands, Apr. 21, 1954,
186,914
9 Claims. (Cl. 260—771)

This application is a divisional application of U.S. Serial No. 502,532, now U.S. Patent 2,972,586.

As electrodialyzing membranes originally practically neutral membranes were generally used, that is to say membranes allowing anions and cations to pass to substantially the same extent. The theoretically maximal Coulomb efficiency obtained is relatively small.

It has therefore been proposed to make these membranes permselective either to anions or to cations, by incorporating polar groups in them. Thus there are known, e.g. membranes of oxidized cellulose or nitrocellulose, membranes of the same substances in which basic dyes have been absorbed, membranes of polyoses containing reactive hydroxylic groups in which polyoses ionic groups have been incorporated such as sulfonic acid groups or quaternary ammonium groups, protein membranes, if required activated by treatment with salts of polybasic metals, etc.

The starting materials for the production of these membranes always had a relatively low resistivity in salt solutions, since it absorbs the water, in other words has hydrophilic properties.

The membranes prepared in this way generally have a sufficiently low resistivity, but the selectivity is not sufficient, particularly in solutions of salts with a concentration of over one gram equivalent per litre.

It has on the other hand been proposed to produce a membrane by condensing monomeric substances in a membrane form, the starting monomers containing ionic groups in a sufficient quantity. The condensation is preferably effected in such a way that the membrane formed has a sufficient content of water in order to have not too high a resistivity in a salt solution. However, it is also possible to choose such starting materials that the membrane formed has indeed a low water-content, but that the condensate is hydrophilic, so that it swells in water and has thus in a salt solution yet a sufficient conductivity; however, the cohesion of the condensate may not get lost by the swelling.

The condensing of the starting materials without simultaneously removing the water herefrom is a difficult process if membranes are to be prepared, the surfaces of which are over 0.5 m.$^2$, as is required in technical apparatus.

It is also known to prepare membranes by mixing a powdered polymeric substance containing ionic groups, e.g. an ion-exchanger, on mixing rollers with a non-active hydrophobic thermoplastic compound. The membranes formed in this way have as a rule sufficient selectivity, but the electric resistivity generally is higher than is desirable, the mechanical properties often leave much to be desired, at least if the content of active substance is high.

Both membranes prepared by condensing monomers containing ionic groups in a membrane form and membranes consisting of a mixture of powdered ion exchangers in a non-active thermoplastic compound have as a rule a considerable thickness, e.g. 1 to 2 mm. This large thickness influences of course the resistivity of the membrane unfavourably.

The use of a hydrophobic, non-porous foil as electrodialysis membrane has never been proposed, since such a membrane naturally has a very small conductivity.

It is the aim of the invention to provide a simple process for the production of permselective membranes with an improved combination of properties such as low resistivity, small thickness, good tensile strength and high selectivity also in salt solutions with a concentration of over 1 N.

It has been found that by introducing ionic groups with a dissociation constant of at least $10^{-5}$ into thin foils of hydrophobic material with a length and breadth of at least 100 times the thickness in a quantity of at least 0.20 milliequivalent per g. of dry foil, excellent membranes are obtained. By introducing these ionic groups in a quantity of 0.20 milliequivalent per g. of dry foil the hydrophobic starting material is converted into a hydrophilic material, owing to the hydrophilic nature of these groups, said hydrophilic material absorbing sufficient water in a salt solution to become sufficiently electrically conductive.

If the dissociation constant of the ionic groups is smaller than $10^{-5}$ or the quantity of ionic groups is less than 0.20 milliequivalent per g., the selectivity is not sufficient and/or the resistivity of the membrane is too high.

An advantage of this process is that by choosing a foil or film of small thickness as the starting material and to make the incorporation of ionic groups proceed in such a way that the form and the mechanical properties of the film are substantially maintained, it is possible to produce very thin membranes of a thickness of, e.g. 0.02 to 0.3 mm., which is not the case with the known processes, according to which monomeric substances are condensed in membrane form or polymeric compounds containing ionic groups, mixed with a non-active, plastic substance are rolled into foils.

As films of hydrophobic material started from may be mentioned polyvinyl chloride, copolymers of vinyl chloride such as, e.g. copolymers of vinyl chloride and vinylidene chloride, chlorinated rubber, rubber hydrochloride, polystyrene and copolymers of styrene, and polyethylene.

The ionic groups which are particularly suitable are sulfonic groups, quaternary ammonium groups, tertiary sulfonium groups, guanidinium groups and pyridinium groups.

The membranes obtained according to the process excel by their high selectivity. The cause of this presumably is that these membranes exclusively allow ions to pass on those spots where ionic groups have been introduced, so that practically no transport of oppositely charged ions through the membrane can take place.

With the known permselective membranes prepared from foils the starting material is permeable both to anions and cations, and it is found to be practically impossible to prevent transport of ions in both directions by incorporating ionic groups, especially in concentrated solutions. The reason may be that there are always spots left where there are not sufficient ionic groups present, so that the electrical properties are substantially determined by the nature of the hydrophilic starting material which in itself is not selective.

If with the process of the invention the quantity of incorporated ionic groups is not sufficient to cause the resistivity to be lower than 500Ω per cm.$^2$, in equilibrium with a 0.1 N NaCl solution, the membrane is not fit for use in practice.

In the process of the invention preferably so many ionic groups are incorporated in the hydrophobic foil that in a 0.1 N NaCl solution the resistivity is not over 100Ω/cm.². In many cases it was found to be possible to obtain considerably lower resistivities, even of less than 10Ω/cm.², without the selectivity being perceptibly reduced or the diffusion being considerably increased.

Reactions which are applied in the process of the invention to convert the hydrophobic films in a permselective, hydrophilic membrane may be known in itself; however, it is not known to apply these reactions to a foil of this material, the length and breadth of which is at least 100 times the thickness, in order to obtain permselective membranes.

As reactions which may serve to introduce ionic groups into a film of hydrophobic, polymeric material may e.g. be mentioned the replacement of halogen atoms, specially chlorine atoms from halogen-containing, filmforming polymers such as rubber-hydrochloride, chlorinated rubber, polyvinyl chloride and copolymers hereof by quaternary ammonium groups or guanidinium groups, tertiary sulfonium groups or sulphonic groups, which may be carried out by reacting films of these chlorine-containing polymers with compounds of the group comprising tertiary-amines, guanidines, organic disulfides, concentrated sulfuric acid or chlorosulfonic acid.

It is also possible to replace hydrogen atoms of polystyrene by sulfonic groups by treatment with concentrated sulfuric acid. It is also possible to incorporate quaternary ammonium groups in a polystyrene film by treatment of a chloromethylated styrene with trimethyl amine.

On introducing ionic groups into a hydrophobic foil it is sometimes possible that the foils do not react evenly over the whole surface with the reacting agent incorporating ionic groups, so that the local properties in one membrane and also in various membranes mutually differ.

It has been found that this difficulty can be obviated by reacting the reacting agent dissolved in a solvent which is capable of penetrating into the hydrophobic foil. The reaction proceeds more evenly and in a reproducible way, so that membranes which should have previously chosen properties all over their surfaces could be prepared.

It has even been found to be possible to cause reactions to proceed along these lines, which reactions were impracticable without the use of an organic solvent penetrating the membrane.

The solvent should preferably be polar, that is to say have a high dielectric constant, or contain a polar substance which, as well as the solvent which promotes the rate of the reaction, does not take part in the reaction.

Therefore the solvents which may be used are substantially organic substances such as aliphatic and aromatic alcohols, ketones, halogen compounds, aliphatic or aromatic nitro compounds, carbonic amides and the like; hydrocarbons as such are less suitable but may be used in some cases, mixed with a polar substance.

*Example I*

A film of chlorinated rubber with approx. 60% by wt. of chlorine containing 40 parts by wt. of dioctyl phthalate as plasticizer per 100 parts by wt. of chlorinated rubber, which film was 0.09 mm. thick, the resistivity of which in 0.1 N NaCl solution is very high, was treated with a solution of 25% trimethyl amine in water at 20° C. for 22½ hours. The film then had a dark-brown colour, its capacity being 0.27 milli-equivalent ionic groups per g.

The selectivity of the film thus treated between salt solutions of 0.1 and 0.2 N KCl is over 80%.

It was found that at the same temperature a solution of 25% trimethylamine in ethyl alcohol (in which chlorinated rubber slightly swells) acts much more quickly and gilves a more even and better reproducible result. A film of chlorinated rubber with a thickness of approx. 120μ (in the same composition) was treated with a solution of 25% trimethyl amine in ethyl alcohol at 20° C. After 24 hours the resistivity had fallen to 0.6Ω/cm.² in 0.1 N NaCl solution; the capacity was 2.3 milli-equivalent ionic groups per g. dry substance. Also with this low resistivity and high capacity the membrane obtained allows only few ions to pass through in an undesired direction: the diffusion amounted to only $18 \times 10^{-6}$ gram equivalent cm.² per hour if the membrane was used as partition between a solution of 0.1 N NaCl and distilled water. The selectivity, measured from the membrane potential between solutions of 0.1 and 0.2 N KCl was approx. 85%.

If the duration of action of the solution was shorter the resistivity is a little higher, but also the selectivity is somewhat higher.

*Example II*

Commercial Pliofilm (rubber hydrochloride) (chlorine content 31%) without plasticizer, with a thickness of 0.064 mm. was treated with sulfuric acid containing 10% sulphur trioxide at 20° C. for various periods. The properties of the tea-coloured films were as follows:

| Reaction time | Resistivity in 0.1 N NaCl solution, Ω/cm.² | Selectivity between 0.1 and 0.2 N KCl, percent | Capacity |
| --- | --- | --- | --- |
| 1 h | 63 | 94 | 0.68 |
| 1½ h | 25 | 86½ | 0.70 |
| 2 h | 16 | 97 | 0.74 |
| 3½ h | 8 | 98½ | 0.97 |

The resistivity of a film of the same composition with a thickness of 45μ, treated at 20° C. with the same bath was only 2.5Ω/cm.² in 0.1 N NaCl solution in water after 3½ hours.

The capacity after this treatment was 1.06 milliequivalent per g. of dry substance; the selectivity between 0.1 and 0.2 N KCl was practically 100%, between 0.5 and 1 N KCl approx. 85% and between 1 and 2 N KCl approx. 70%.

*Example III*

A stiff, parchlike film of polyvinyl chloride without plasticizer with a thickness of 0.18 mm. was placed in a bath of chlorosulfonic acid for 3 hours. After the treatment this film is introduced into water by rinsing with gradually less concentrated acid and finally with pure water (the film disintegrates if directly brought into pure water). The film which is saturated with water is supple and has a gold-brown colour; it is substantially permselective as membrane between 1 and 2 N KCl and has a resistivity of 170Ω/cm.².

*Example IV*

A film of Saran (a copolymer of vinyl chloride and vinylidene chloride), with a thickness of 0.055 mm. was treated with a solution of sodium amide in liquid ammonia at −50° C. for 3 hours; then the ammonia was gradually evaporated and the excess of sodium amide was decomposed with water. The membrane obtained was very dark and had a content of ionic groups of 0.33 milli-equivalent per g. dry substance, and had good permselective properties, but a relatively high resistivity of approx. 300Ω/cm.².

*Example V*

A solution of trimethyl amine in water not or hardly acts upon Saran. After 100 hours a film of Saran of 65μ, treated with a solution of 25% trimethyl amine in acetone has a resistivity in 0.1 N NaCl solution of only 4Ω/cm.². By this treatment the thickness increases to approx. 200μ and a black membrane results; the capacity amounts to approx. 0.7 milliequivalent of dry substance. The mechanical strength is good, the selectivity, determined between 0.1 and 0.2 N KCl is substantially 100%; between 1 and 2 N KCl yet approx. 80%.

*Example VI*

A film of chlorine rubber having a thickness of approx. 125µ was reated with a solution of 10% dimethyl sulfide in benzyl alcohol at room temperature. After 24 hours the resistivity measured in 0.1 NaCl solution was yet 450Ω/cm.²; after 40 hours approx. 100Ω/cm.² and after 70 hours approx. 30Ω/cm.².

*Example VII*

A foil of polyvinyl chloride having a thickness of 115µ was treated with a solution of 50% pentamethyl guanidine in acetone at approx. 20° C. for 24 hours. The resistivity of the foil decreased to approx. 11Ω/cm.² in 0.1 N NaCl; the foil remained strong and was also anion-selective at a high concentration.

If the reaction is carried out with a solution of 25% pentamethyl guanidine in acetone, the action proceeds somewhat more quickly; the resistivity of the membrane is then only 7Ω/cm.² after a treatment of 24 hours.

*Example VIII*

Dimethyl sulfide which is practically insoluble in water, has, if mixed with 25% acetone wherein it is easily soluble, a very smooth action on a film of polyvinyl chloride.

After a treatment of about 30 hours at about 20° C. of a commercial foil of polyvinyl chloride having a thickness of 115µ with this solution, the resistivity, measured in a 0.1 N NaCl solution had fallen from substantially ∞ to approx. 40Ω/cm.², after 45 hours to approx. 10Ω/cm.². The colour of the film is white the thickness is slightly reduced, the strength substantially unaltered.

*Example IX*

If a usual commercial film of polystyrene is sulfonated it disintegrates into parts.

However, if a tension-free film is cast from polystyrene from a solution, it can be sulfonated well.

After evaporation of the solvent a film of polysytrene cast from a solution in toluene was treated with chlorosulfonic acid at 35° C. for 110 minutes. As a result of this treatment the resistivity, which is originally substantially ∞ decreases to approx. 230Ω/cm.², measured in 0.1 N NaCl solution. The surface of the film thus obtained is more or less adhesive, but in spite of that the tensile strength of the film is sufficient, also in the wet state. If this film is used as cation-selective membrane in an electrodialysis apparatus it proved to be substantially anion-impermeable.

The capacity of the membrane amounted to 0.44 milliequivalent per gram of dry substance. In accordance with 35 U.S.C. 120 applicants rely upon the filing date, April 19, 1955, of U.S. Ser. No. 502,532, now U.S. Patent 2,972,586.

We claim:

1. The process of converting a mechanically-stable, self-supporting film of an organic linear, fusible, hydrophobic polymeric substance selected from the group consisting of rubber hydrochloride and chlorinated rubber, said film having a high resistance and a thickness of from about 0.02 to 0.3 millimeter, into a homogeneous mechanically-stable, self-supporting perm-selective membrane having an electrical resistance of less than 500~ per cm.² as measured in equilibrium with a 0.1 N aqueous sodium chloride solution, which comprises: reacting said film with a compound having a dissociation constant of at least 10⁻⁵ selected from the group consisting of guanidines, pyridines, diorganic sulfides, and tertiary amines, concentrated sulfuric acid and chloro sulfonic acid, by contacting said hydrophobic film with said compound whereby sufficient of the chlorine atoms in said hydrophobic film are replaced with ion exchange radicals selected from the group consisting of quaternary ammonium, sulfonic, guanidinium, pyridinium and tertiary sulfonium groups to the extent that at least 0.2 milliequivalents of said ion exchange radicals are present per gram of said perm-selective membrane, said membrane having substantially the same form and mechanical properties as said starting film.

2. The process of claim 1, wherein the substance of said film is a chlorinated rubber and said ionic groups are quaternary ammonium groups.

3. The process of claim 1, wherein the substance of said film is rubber hydrochloride and said ionic groups are pentamethylguanidinium groups.

4. The process of claim 1, wherein said film is a chlorinated rubber, said compound is trimethyl amine.

5. The process of claim 1, wherein said film is rubber hydrochloride, said compound is pentamethyl guanidine.

6. The process of converting a substantially ion-impervious, hydrophobic, synthetic, thermoplastic, mechanically-stable, self-supporting linear polymeric film of high electrical resistance, selected from the group consisting of rubber hydrochloride and chlorinated rubber, said film having a thickness of from about 0.02 to 0.3 millimeter, into a homogeneous, mechanically-stable, self-supporting perm-selective membrane having an electrical resistance of less than 100Ω per cm.² as measured in equilibrium with a 0.1 N aqueous sodium chloride solution which comprises reacting said film with a compound having a dissociation constant of at least 10⁻⁵ selected from the group consisting of guanidines, pyridines, diorganic sulfides, sulfuric acid, chlorosulfonic acid and tertiary amines by contacting said hydrophobic film with said compound dissolved in a normally liquid polar to semi-polar organic solvent capable of penetrating said hydrophobic film, said solvent having a high dielectric constant and being selected from the group consisting of alcohols and ketones, for at least 24 hours, whereby sufficient of the chlorine atoms in said film are replaced with ion exchange radicals selected from the group consisting of quaternary ammonium, guanidinium, pyridinium and tertiary sulfonium groups to the extent that at least 0.2 milliequivalents of said ion exchange radicals are present per gram of said perm-selective membrane and the dissociation constant of said ion exchange radicals in said membrane is at least 10⁻⁵, said membrane having substantially the same form and mechanical properties as said starting film.

7. A method of transferring anions from one electrolytic solution to another to the substantial exclusion of cations comprising separating said solutions by means of a barrier and forcing anions through said barrier by electrical means, said barrier comprising a self-supportable, homogeneous perm-selective membrane of a synthetic thermoplastic, linear polymer matrix selected from the group consisting of rubber hydrochloride and chlorinated rubber, said matrix containing anion exchange radicals selected from the group consisting of quaternary ammonium, guanidinium, pyridinium and tertiary sulfonium groups to the extent that at least 0.2 milliequivalent of said anion exchange radicals are present per gram of said perm-selective membrane and the dissociation constant of said anion exchange radicals in said membrane is greater than 10⁻⁵, said membrane having a thickness of from about 0.02 to 0.3 millimeter and having an electrical resistance of less than 100~ per cm.² as measured in equilibrium with a 0.1 N aqueous sodium chloride, solution, said membrane produced by reacting a film of an organic hydrophobic, fusible, mechanically-stable, self-supportable linear polymeric substance selected from the group consisting of rubber hydcochloride and chlorinated rubber with a compound having a dissociation constant of at least 10⁻⁵ selected from the group consisting of guanidines, pyridines, diorganic sulfides and tertiary amines, by contacting said hydrophobic film with said compound dissolved in a normally liquid polar to semi-polar organic solvent capable of penetrating said hydrophobic film, said solvent having a high dielectric constant and being selected from the group consisting of alcohols and ketones, for at least 24 hours whereby sufficient of the chlorine atoms in said film are replaced with anion exchange radicals selected from the group consisting of quaternary ammonium guanidinium, pyridinium and tertiary sulfonium groups to decrease the electrical resistance of said membrane to the aforesaid value, said membrane having substantially the same form and mechanical properties as said starting film.

8. A method according to claim 7, wherein said barrier membrane has an electrical resistance of less than 10 per cm.$^2$.

9. A homogeneous mechanically-stable, self-supporting perm-selective membrane, as produced by the methods of claim 1.

References Cited by the Examiner

UNITED STATES PATENTS

| | | | |
|---|---|---|---|
| 2,636,851 | 4/1953 | Juda | 260—2.1 |
| 2,681,320 | 6/1954 | Bodamer | 260—2.2 |
| 2,730,768 | 1/1956 | Clarke | 260—2.2 |
| 2,732,351 | 1/1956 | Clarke | 260—2.1 |
| 2,800,445 | 7/1957 | Clarke | 260—2.1 |
| 2,820,756 | 1/1958 | Wyllie | 204—180 |
| 2,858,264 | 10/1958 | de Jong | 204—296 |
| 2,867,575 | 1/1959 | de Jong | 204—296 |
| 2,972,586 | 2/1961 | Van der Neut et al. | 260—2.1 |
| 3,086,947 | 4/1963 | Kuwata et al. | 260—2.2 |

WILLIAM H. SHORT, *Primary Examiner.*

H. N. BURSTEIN, *Examiner.*